United States Patent [19]

Morse

[11] 4,436,965
[45] Mar. 13, 1984

[54] SEALING MEANS FOR TELEPHONE COVER DEVICE

[75] Inventor: Milton Morse, Fort Lee, N.J.

[73] Assignee: APM Corporation, Englewood, N.J.

[21] Appl. No.: 299,509

[22] Filed: Sep. 4, 1981

Related U.S. Application Data

[63] Continuation-in-part of Ser. No. 236,757, Feb. 23, 1981, and a continuation-in-part of Ser. No. 61,647, May 7, 1981, and a continuation-in-part of Ser. No. 286,063, Jul. 23, 1981.

[51] Int. Cl.$^3$ ............................................ H02M 1/23
[52] U.S. Cl. ............................... 179/184; 200/302.1; 179/90 K; 179/178
[58] Field of Search ......................... 179/184, 186, 25; D14/66; 340/365 S; 250/465; 200/333, 340, 302; 428/40, 41; 156/329

[56] References Cited

U.S. PATENT DOCUMENTS

| D. 257,631 | 12/1980 | Le Cornu | D14/66 |
| 2,725,322 | 11/1955 | Muttera, Jr. | 428/41 |
| 4,059,737 | 11/1977 | Gergaud | 200/302 |
| 4,220,342 | 9/1980 | Shah | 156/329 |

FOREIGN PATENT DOCUMENTS

| 5016521 | 5/1980 | Japan | 179/184 |

OTHER PUBLICATIONS

"Keyboard Cover", *Telephony*, Jul. 20, 1981, p. 94.

"Keyboard Transducer", *IBM TDB*, vol. 7, No. 12, May 1965, p. 1170.

*Primary Examiner*—G. Z. Rubinson
*Assistant Examiner*—L. C. Schroeder
*Attorney, Agent, or Firm*—Weingram & Klauber

[57] ABSTRACT

A gasket is disclosed for use in effectively sealing to communications equipment, a protective cover for a key-actuated switching array which projects through a generally planar surface on the equipment. The protective cover is of the type comprising a flexible elastomeric sheet having one or more recessed pockets adapted to overlie and receive the array of key-actuated switches, whereby each of switches is independently depressible through the sheet. The sheet includes a skirt-like border portion extending laterally beyond the pockets, and the sheet is continuous between its lateral edges, whereby the key switch array may be overlaid by the one or more pockets, with the skirt-like border portion contacting the planar surface beyond the array. The array is thereby protected from spillage of liquids or the like. The gasket is adapted to extend completely around the periphery of the sheet in overlying relation to the border portion. The gasket is flexible and adherent to the border portion of the sheet and to the planar surface of the equipment. The gasket prior to use has covers on its opposite sides which are removable for attachment of the gasket by the application of pressure to the sheet and to the planar surface of the equipment.

8 Claims, 17 Drawing Figures

FIG. 1  FIG. 2
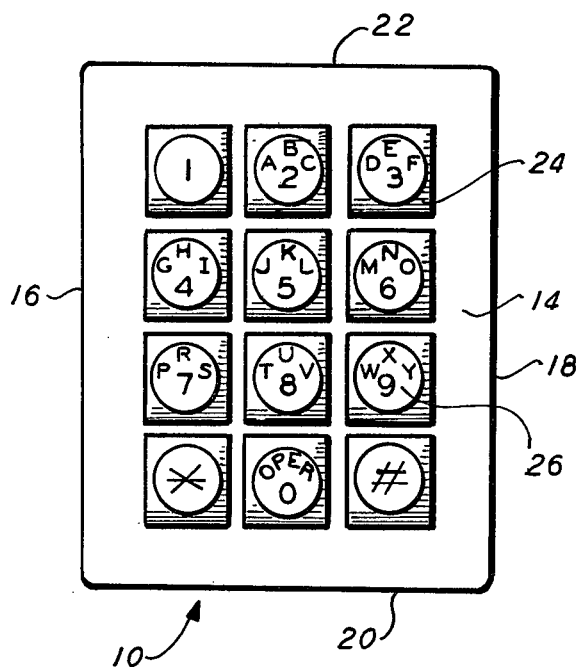
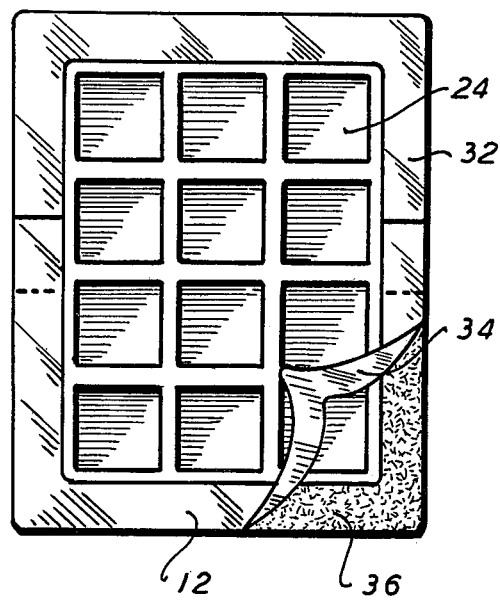
FIG. 3
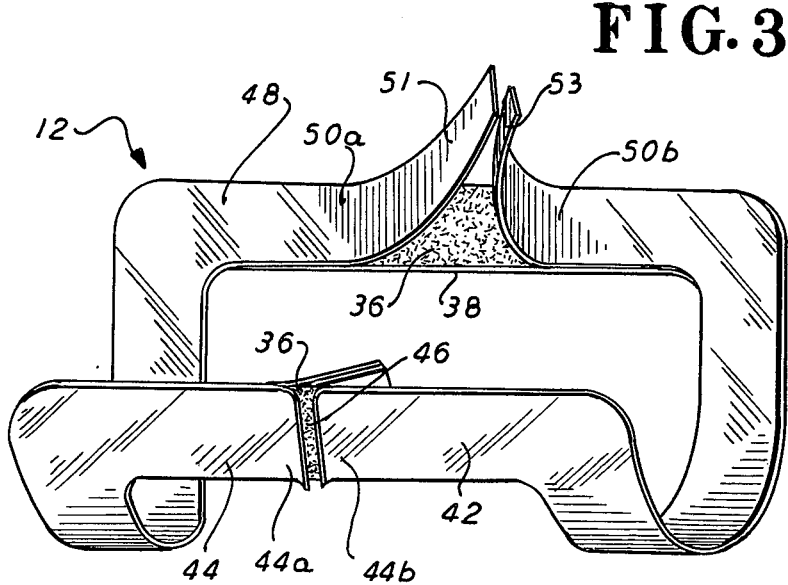
FIG. 4
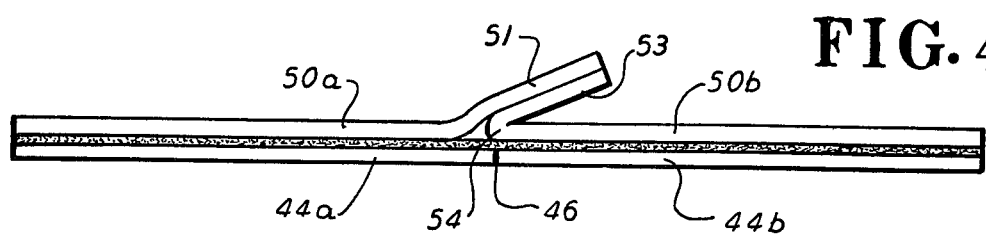

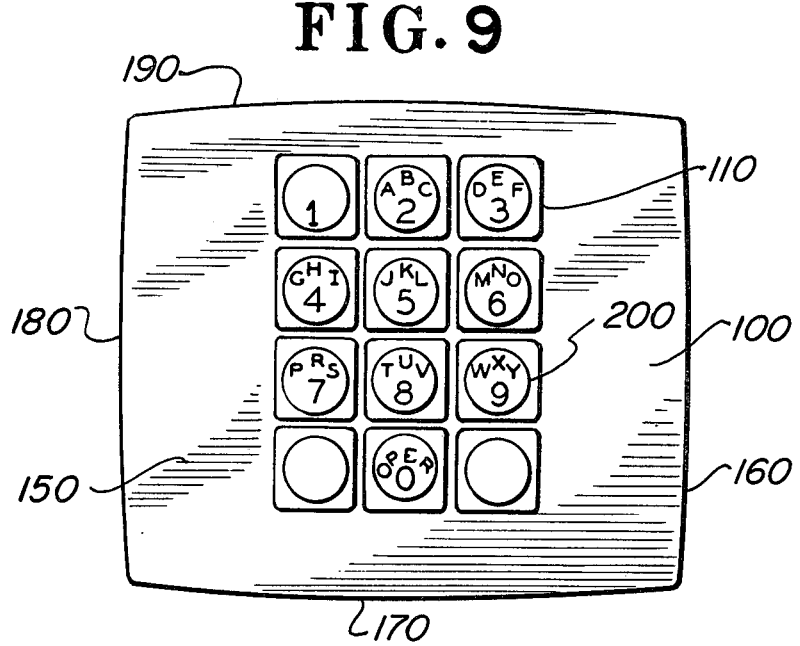
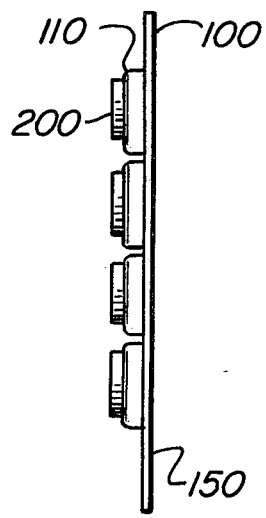
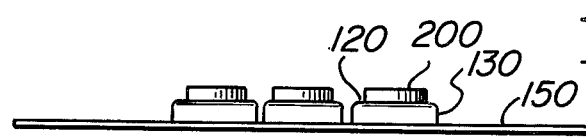
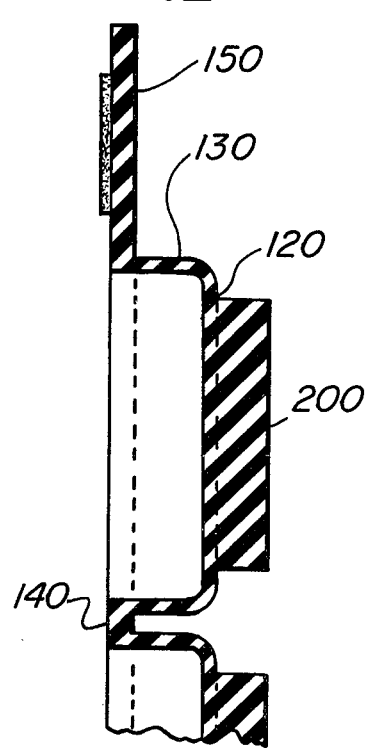
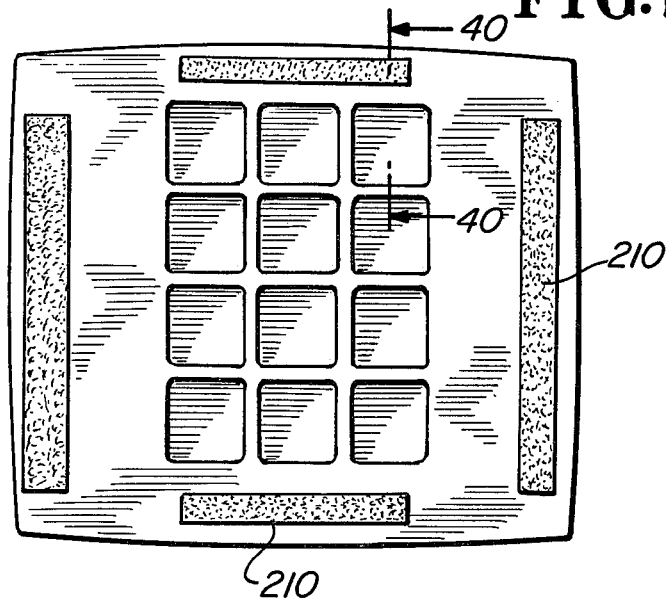

FIG.14
FIG.15
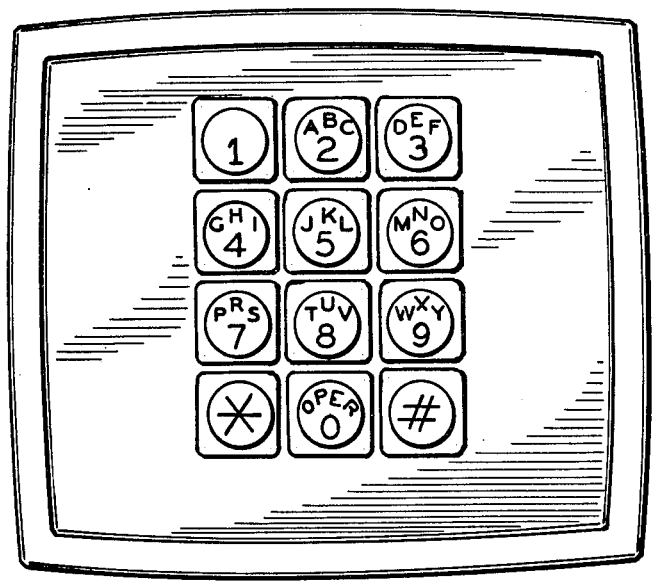
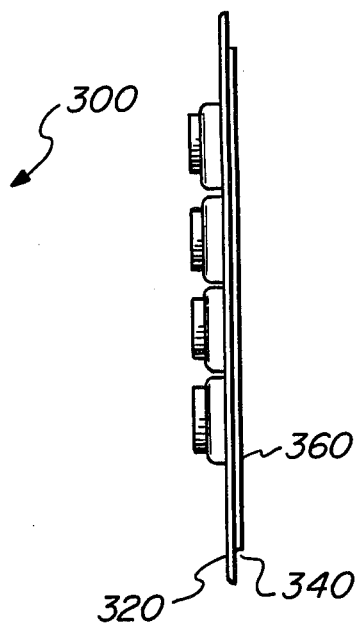
FIG.16
FIG.17
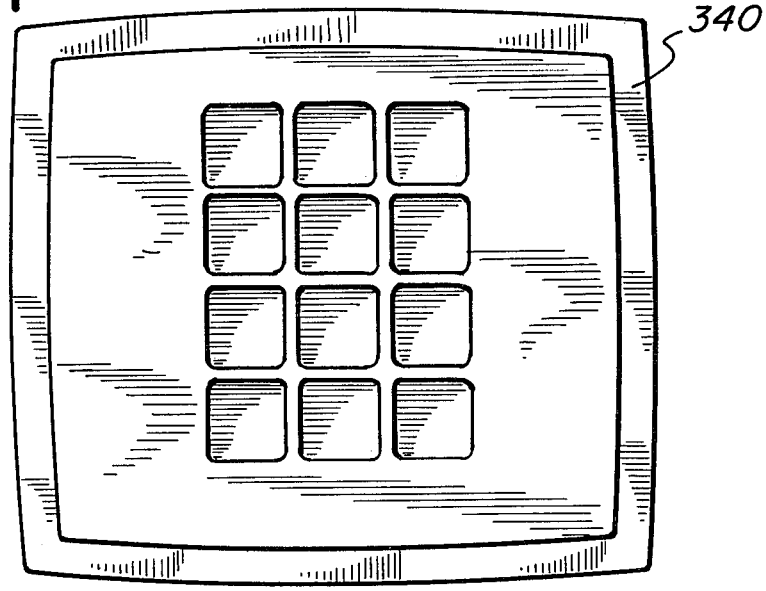

SEALING MEANS FOR TELEPHONE COVER DEVICE

BACKGROUND OF INVENTION

This application is a continuation-in-part of my copending applications Ser. No. 236,757 filed Feb. 23, 1981, Ser. No. 61,647 filed May 7, 1981, and Ser. No. 286,063 filed July 13, 1981.

This invention relates generally to protective covering devices for use in connection with arrays of key-operated switches. Arrays of this type are exemplified by the push-buttons on a conventional push-button type telephone set. More specifically, the invention relates to a gasket which coacts with the covering device and the telephone set in order to enable a positive and effective seal between the covering device and telephone set.

Within recent years, telephone sets incorporating push-button arrays, commonly including twelve such push-buttons, have come into wide spread use and have largely supplanted the previously common rotary dial-type telephone. The individual push-buttons comprising such a telephone set array normally project through the cover of the telephone, or a portion of the telephone cover. The remainder of the switching array is contained beneath this outer shell of the telephone set. In various environments, including especially industrial and commercial environments, but as well in the home, this telephone set, which is usually conveniently placed with respect to a work station, is subject to damage from environmental hazards, including especially to spillage of liquids, which can readily seep through the openings surrounding the individual push-button keys and cause damage, in some cases irreparable damage, to the underlying switching mechanisms. It is further to be appreciated in this connection, that in addition to the said common twelve dialing push-buttons, many telephone sets include one or more rows of further pushbuttons beneath the dialing array, which buttons are used for signaling, or represent additional telephone lines or so forth. These further push-buttons present similar problems with respect to damage by liquids or similar environmental hazards, as for example, dust or sand.

In my aforementioned copending U.S. patent applications, I have disclosed a new type of telephone covering device which is especially useful in eliminating the aforementioned difficulties. The said device generally comprises a flexible elastomeric sheet, having one or more pockets therein, which are adapted to receive and overlie the push-buttons in the array of push-buttons on the telephone set. Thus, each of the push-buttons in the array fit into pockets of the cover, so that when the cover is emplaced over the set, all of the push-buttons are covered and the buttons may be operated by depressing the outwardly projecting pockets.

The protective cover of my said applications is further provided with a skirt or border portion, which extends beyond the push-button covering pockets and the sheet is continuous between the lateral edges of same. As disclosed in my aforementioned applications, it was contemplated that the said covering device would be attached to the telephone set by means of adhesive strips or the like provided at the border portion of the cover. In some instances, these strips comprised a layer of pressure sensitive adhesive which was covered with strips of paper which were removed prior to emplacing the cover. Alternatively it was also contemplated that a flowable adhesive could be applied directly to the cover prior to use, i.e., prior to being emplaced.

In practice, it was found however, that the aforementioned techniques of attaching the cover were not as effective as desired, and that a fluid-tight seal could not in all cases be obtained. Further, the device which included adhesive strips, did not readily lend itself to mass production techniques.

SUMMARY OF INVENTION

Now in accordance with the present invention, I have devised an improved means for effectively sealing the aforementioned protective covering devices to equipment such as telephone sets and the like.

In accordance with the present invention, a gasket is provided for use in effectively sealing to communications equipment, a protective cover for a key-actuated switching array which projects through a generally planar surface on the equipment. The protective cover is of the type comprising a flexible elastomeric sheet having one or more recessed pockets adapted to overlie and receive the array of key-actuated switches, whereby each of the switches is independently depressible through the sheet. The sheet includes a skirt-like border portion extending laterally beyond the pockets; and the sheet is continuous between its lateral edges, whereby the key switch array may be overlaid by the one or more pockets, with the skirt-like border portion contacting the planar surface beyond the array. The array is thereby protected from spillage of liquids or the like. The gasket is adapted to extend completely around the periphery of the sheet in overlying relation to the border portion. The gasket is flexible and adherent to the border portion of the sheet and to the planar surface of the equipment. The gasket prior to use has covers on its opposite sides which are removable for attachment of the gasket by the application of pressure to the sheet and to the planar surface of the equipment.

BRIEF DESCRIPTION OF DRAWINGS

The invention is diagrammatically illustrated, by way of example, in the drawings appended hereto, in which:

FIG. 1 is a front plan view of a sealing cover of the type with which the present invention is utilized;

FIG. 2 is a rear plan view of the device of FIG. 1, showing the gasket of the invention secured thereto;

FIG. 3 is a perspective view, showing the general configuration of a gasket in accordance with the present invention;

FIG. 4 is a side elevational view of the gasket of FIG. 3;

FIG. 9 is a top view of a protective cover for a push-button telephone set as disclosed in my aforementioned Ser. No. 236,757 application;

FIG. 10 is a side view of the cover of FIG. 9;

FIG. 11 is another side view of the FIG. 9 device;

FIG. 12 is a side view of a single pocket of the array in FIG. 9;

FIG. 13 is a bottom view of the device of FIG. 9, showing the adhesive strips that can be provided for same;

FIG. 14 is a top plan view of a further embodiment of a device in accordance with the invention;

FIG. 15 is a side view of the device of FIG. 14;

FIG. 16 is a further side elevational view of the device of FIG. 14; and

FIG. 17 is a bottom view of the device of FIG. 14.

DESCRIPTION OF PREFERRED EMBODIMENT

Figure 5:
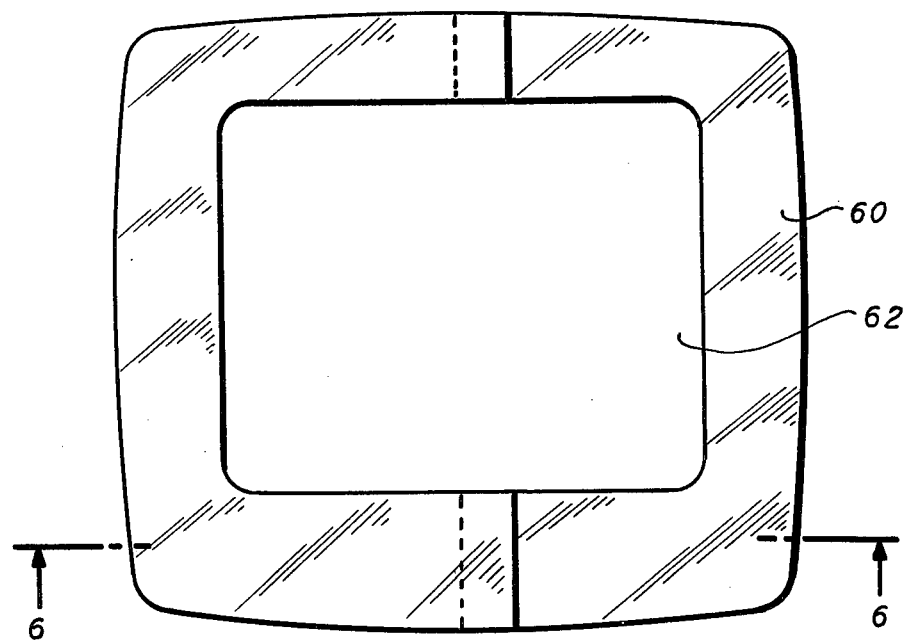
FIG. 5 is a top plan view of the gasket of FIG. 3.

In FIGS. 1 and 2 herein, there appears a telephone cover device generally indicated at 10, to which is secured a sealing gasket 12 in accordance with the invention. The gasket 12 is more specifically illustrated in the showing of 3, and in FIGS. 4 through 6.

The telephone covering device 10 has been disclosed elsewhere, more specifically in my aforementioned copending applications, the contents of which are to be regarded as incorporated herein by reference, as if set forth fully herein. Generally, such device 10, as may be seen from FIGS. 1 and 2, comprises a sheet 14 of an elastomeric material, such as a natural or artificial rubber, an elastomeric plastic or the like, which sheet is continuous between its lateral edges 16, 18, 20, and 22, and which is molded or otherwise deformed, so as to be provided with a plurality of pockets 24, which project upwardly from the plane of the paper in FIGS. 1 (and downwardly from the plane of the paper in FIG. 2). Pockets 24 are adapted to receive the push-buttons of a typical push-button type telephone set when the said cover 10 is emplaced atop the telephone set in overlying relationship to the array of dialing buttons. As may be seen from FIG. 1, indicia 26, corresponding to the underlying indicia on the telephone push-buttons are provided; and in use, the operator of the phone merely need depress the outwardly accessible portion of pockets 24 to in turn depress the underlying push-buttons and operate the telephone set.

As may be seen from the view of FIG. 2, which represents the rearward side of device 10, i.e., the side of device 10 which will be placed in face-to-face contact with the telephone set, is (in accordance with the invention) associated with a gasket 12, which is placed directly in contact with the skirt-like border portion 32 of device 10. In FIG. 2, one surface of gasket 12 has already been secured to this skirt-like portion and part of the paper covering 34 has been lifted from the gasket 12, so that the underlying adhesive 36 can be seen.

Referring to FIG. 3, the gasket 12 is thus seen to comprise a base material 38, which preferably comprises a paper or cloth-like material of relatively high strength, as for example, a paper or cloth which has been reinforced with fiberglass strands. Each side of such base material 38 is provided with a pressure-sensitive adhesive 36 to enable the gasket to be secured to both the device 10 as well as to the telephone set. In order to enable use of the device, it is seen that side 42 of gasket 12, which is the side preferably secured to device 10, is provided with covering strips 44 of paper. These strips 44 extend as two U-shaped portions 44a and 44b with the legs of the "U" being slightly separated to provide a gap 46, which enables the user to readily grasp the ends of such portions and remove them prior to use of the gasket. Gap 46 may also be seen in the side view of FIG. 4.

The opposed face 48 of gasket 12 (which is the side facing outwardly from the device 10 and which will ultimately be the side of the gasket placed in contact with the telephone set) prior to affixation of device 10 to the set, is covered with two further U-shaped strips of protective paper 50a and 50b. The legs or end portions 51 and 53 of these U-shaped strips 50a and 50b, overlap, and a particular arrangement is used to facilitate removal of such strips. Such arrangement is best seen in FIG. 4, where it is noted that the legs 53 of strip 50b are bent over as at 54, i.e., bent backward upon themselves and the legs 51 of strip 50a are made to overlap legs 53. Thus, it will be clear that in use, the operator need only pull back legs 51 to gain access to the flap-like portion 53, whereupon the strips 50a and 50b are readily removed to expose the underlying pressure sensitive adhesive 36, after which the gasket 12 is ready for securing to the telephone set.

Figure 6:
FIG. 6 is a cross-sectional view of the FIG. 5 gasket, taken along the line 6—6 of FIG. 5.

It will be clear, for example, by reference to FIGS. 5 and 6, that the gasket 12 is designed to provide a continuous portion 60, which when placed in contact with the rearward side of a covering device 10, completely covers the skirt-like border 32 of such device. The gasket 12 is similarly, provided with a cut-out 62 at the center, which coincides with the pockets 24, so that same are open to receive the pushbuttons of the telephone set.

The gasket of the present invention will in general be configured for the particular arrangement of push-buttons on the telephone set with which the specific covering device is intended to interact. Thus, a further embodiment of the invention appears in FIG. 7. This gasket 13 is used with a covering device intended to cover not the central telephone push-buttons used for dialing purpose, but rather for an instance wherein two rows of push-buttons appear at the bottom of a telephone set. These type of push-buttons are used for intercom arrangements or to activate different outside telephone lines in common office-type telephone systems.

Figure 7:
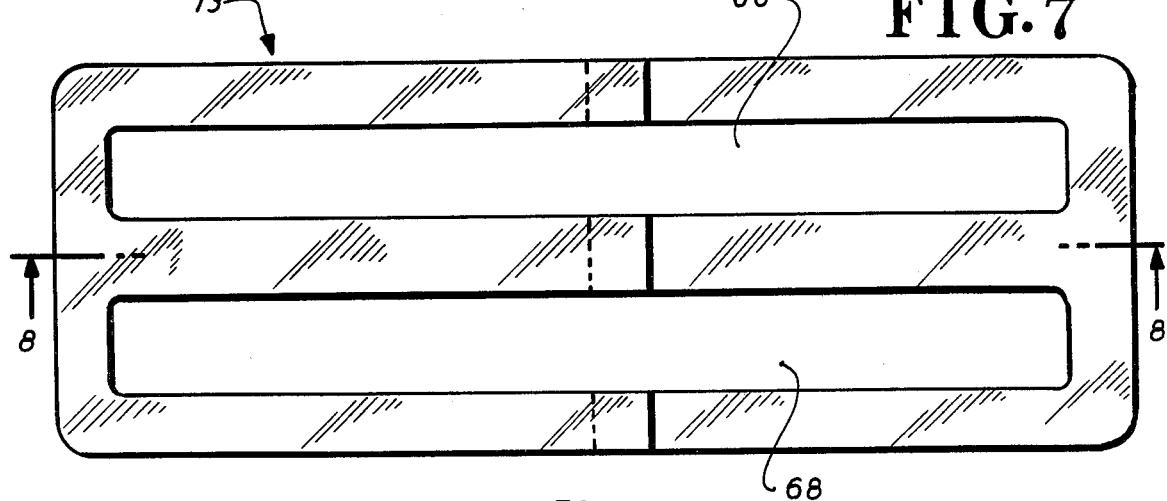
FIG. 7 is a top plan view of a further embodiment of a sealing gasket in accordance with the invention.

Thus, in the instance of FIG. 7, the gasket 13, while otherwise similar to that already described, includes two elongated rectangular cut-outs 66 and 68, which coincide with two single elongated pockets on a covering device of the type disclosed in my aforementioned applications, and which has already been described.

Figure 8:
FIG. 8 is a cross-sectional view of the FIG. 7 gasket, taken along the line 8—8 of FIG. 7.

The arrangements of the covering strips as seen in the side view of FIG. 8 is identical to what has been described for the gasket 12; with the paper strips 70 being arranged and removed in similar fashion.

Further details of the telephone covering device 10 may be appreciated from FIGS. 9 through 16, which correspond to the disclosure of my Ser. No. 236,757 application.

The cover 100 of FIG. 9 is made of an elastomeric material such as rubber, or it may be made of a plastic material such as polyvinylchloride. A number of pockets are provided in the cover, generally shown as 110. Each of these pockets has a top portion 200 and sidewall portion 130, which conform to the shape of the underlying push-button. Adjoining pockets are joined by the material of the cover as shown by 140 in FIG. 12; thus each of the buttons in the push-button array in a telephone set are adapted to fit into each of the pockets of the cover so that when the cover is placed over the telephone set all of the pushbuttons are covered.

The cover is provided with a skirt 150, which extends beyond the pushbutton array, the sheet itself being continuous between the lateral edges generally shown as 160, 170, 180 and 190. At the top of each of the pockets a raised portion or mesa 200 is provided which may be provided with an indicia corresponding to the indicia on the underlying button of the telephone set. Such indicia can be directly molded into mesa 200, or can be applied thereto, as by printing or so forth.

To facilitate attachment of the cover 100 to the telephone set, the underside may be provided with adhesive strips 210, which initially are covered with paper which is removed before the strip is attached. These strips, it should be noted, are entirely optional and they may be omitted, if desired. They serve simply to secure the cover to the telephone set.

In a further aspect of the invention, the projecting portion 200 of the pocket can be coated with, or made of a phosphorescent material which can glow in a darkened environment if properly energized. For example, certain phosphers will glow for a limited time after exposure to ambient light or may be caused to glow by exposure to ultraviolet radiation. In some cases phosphers can be used which will glow in response to a radio frequency field. The means for producing a phosphorescence in such cases is so well known that no showing of such means is indicated in the drawing.

The protective cover 100 may be colored to match the telephone set if desired.

In FIGS. 14 through 17, a further embodiment of a protective cover in accordance with the invention appears. The cover 300 shown therein is in most respects similar to the embodiment of the device depicted in FIGS. 9 through 13, and corresponding elements are identified by corresponding reference numerals. The distinction between the two embodiments is that cover 300 is provided with a bordering portion 320, the lower surface 340 of which is recessed with respect to the remaining lower surface 360 of cover 300. In this embodiment, instead of using adhesive strips 210 as in the FIGS. 9 to 13 embodiment, the recessed surface 340 is initially free of any adhesive. In using device 100, one applies to the recessed surface 340 (or to portions of surface 360 or to the telephone face to which the device is to be affixed), a small quantity of adhesive, which preferably can be a material such as a rubber cement (which does not permanently bond and can therefore be removed without damage), and then applies moderate pressure between the cover 300 and the telephone face to effect adherence between the two.

While the present invention has been set forth in terms of specific embodiments thereof, it will be understood in view of the present disclosure that numerous variations upon the invention are now enabled to those skilled in the art, which variations yet reside within the scope of the present invention. Accordingly, the invention is to be broadly construed, and limited only by the scope and spirit of the claims now appended hereto.

I claim:

1. A protective cover for the push-button array of a push-button telephone set, comprising:
a flexible elastomeric sheet having a grid of upwardly-directed pockets, each of said pockets being defined by substantially vertical side-walls rising above the main plane of said sheet and an upper top portion extending across the tops of said vertical walls, the adjacent vertical walls of adjacent pockets being spaced from each other; said pockets thereby extending above the said plane of said sheet and being open at the lower end for receiving each of the buttons of said array and thereby overlying the corresponding array of push-buttons on said telephone; said top portion of each said pocket being provided with an upwardly protruding portion, the lateral periphery of which is inward of said vertical walls; said pockets being elastically depressible independently of one another toward their open ends, to permit individual displacement of the underlying telephone set push-buttons received in said pockets; said sheet including a skirt portion extending laterally beyond said grid and said sheet being continuous between its lateral edges, whereby said entire push-button array is overlaid by said cover and thereby protected from spillage of liquids or other environmental hazards; and a gasket for effectively sealing said protective cover to said telephone set, said gasket being adapted to extend completely around the periphery of the elastomeric sheet, said gasket being flexible and adherent to the elastomeric sheet and the telephone set; and said gasket having covers on opposite sides thereof which are removable for attachment of the gasket, by the application of pressure, to the elastomeric sheet and the telephone set, respectively.

2. A gasket in accordance with claim 1, wherein said covers for said gasket comprise a pair of U-shaped paper strips applied with the ends of one said "U" facing the ends of the other said "U" upon each surface of said gasket.

3. A device in accordance with claim 2, wherein the legs of said U-shaped strips overlie one another to prevent adherence between the strips at the overlying zone, to facilitate grasping of the uppermost strip for removal.

4. A gasket in accordance with claim 3, wherein the ends of the legs of said "U" of the underlying said strip are folded upon the said strip, to facilitate grasping of the underlying strip for removal of same.

5. A gasket for a protective cover as claimed in claim 1, in which the faces of said gasket are provided with a pressure-sensitive adhesive.

6. A gasket for a protective cover as claimed in claim 5, in which the material comprising said gasket includes reinforcing glass fibers.

7. A gasket for a protective cover as claimed in claim 5 or 6, in which the pressure-sensitive adhesive is a silicone adhesive.

8. A gasket for a protective cover as claimed in claim 1, in which the elastomeric sheet is a rubber.

* * * * *